United States Patent [19]
Ashton et al.

[11] Patent Number: 4,755,230
[45] Date of Patent: Jul. 5, 1988

[54] METHOD OF AND COMPOSITION FOR REMOVING PARAFFIN DEPOSITS FROM HYDROCARBON TRANSMISSION CONDUITS

[75] Inventors: Jefferson P. Ashton, Conroe; Hal W. McSpadden, Woodlands; Tara T. Velasco; Hang T. Nguyen, both of Houston, all of Tex.

[73] Assignee: Baker Oil Tools, Inc., Orange, Calif.

[21] Appl. No.: 36,883

[22] Filed: Apr. 10, 1987

Related U.S. Application Data

[63] Continuation of Ser. No. 691,617, Jan. 15, 1985, abandoned.

[51] Int. Cl.$^4$ .................. C23G 5/036; C23G 5/024
[52] U.S. Cl. ............................. 134/22.14; 252/8.552
[58] Field of Search ...................... 252/8.3, 8.552; 166/300, 304; 134/22.14

[56] References Cited

U.S. PATENT DOCUMENTS

| | | | |
|---|---|---|---|
| 2,073,080 | 3/1937 | Van Peski | 166/304 X |
| 2,356,254 | 8/1944 | Lehmann et al. | 166/304 X |
| 2,470,831 | 5/1949 | Monson | 252/8.552 |
| 3,437,146 | 4/1969 | Everhart et al. | 166/304 X |
| 3,669,189 | 6/1972 | Fischer | 166/304 X |
| 4,207,193 | 6/1980 | Ford et al. | 166/304 X |
| 4,219,083 | 8/1980 | Richardson et al. | 166/300 |
| 4,399,868 | 8/1983 | Richardson et al. | 166/300 |

OTHER PUBLICATIONS

The Condensed Chemical Dictionary, Sixth Edition, 1966, Reinhold Pub. Corp., New York, pp. 411, 438.

Primary Examiner—Herbert B. Guynn
Attorney, Agent, or Firm—William C. Norvell, Jr.

[57] ABSTRACT

A method is provided for removing paraffin deposits from the interior of a hydrocarbon transmission conduit, such as a subsea pipeline. The method comprises the steps of introducing into an isolated length of the conduit containing the paraffin a pre-determinable amount of an emulsified mixture of an aqueous solution and a hydrocarbon solution. The composition used in the method incorporates an aqueous solution which comprises in-situ nitrogen-generating components together with a sufficient amount of a buffered pH adjuster to produce a buffered pH value for the aqueous solution to abate the time of the reaction rate of the nitrogen-generating components to a level permitting introduction of the components into the isolated length prior to completion of any significant portion of the reactin required to effect temperature melting of the paraffin deposits. In a preferred form, a crystalline modifier may be incorporated into the hydrocarbon solution. After treatment, the solutions containing the dissolved pariffin are removed from the isolated conduit section.

4 Claims, 1 Drawing Sheet

METHOD OF AND COMPOSITION FOR REMOVING PARAFFIN DEPOSITS FROM HYDROCARBON TRANSMISSION CONDUITS

This is a continuation of application Ser. No. 691,617, filed Jan. 15, 1985, now abandoned.

BACKGROUND OF THE INVENTION

1. Field of the Invention

The invention relates to a method and composition for effecting the cleaning of an isolated section of a hydrocarbon transmittion conduit, such as a pipeline, to remove paraffin deposits therefrom by chemically effecting the dissolution of the paraffin deposits.

2. History of the Prior Art

As used herein, "hydrocarbon transmission conduits" refers to any cylindrical means for transmitting hydrocarbons above the top surface of a subterranean well, such as means extending from the Christmas tree to and through the sales line, pipelines, conduits transmitting hydrocarbons to and within refineries, and the like. The accumulation of paraffin deposits in hydrocarbon transmission conduits, particularly subsea pipelines, is a problem that has been plaguing the oil-producing industry. By reference to "paraffin", we mean a wax-like organic precipitate from hydrocarbons of the alkane group. These paraffinic waxes are either normal, branched, or cyclic alkanes and are described by the following formula: $C_n H_{(2n+2)}$, where n is a positive integer. These paraffins are generally inert to acids, bases, and oxidizing agents. Typically, when a crude oil containing paraffins flows through pipelines at comparatively reduced temperatures, such as would be encountered in a subsea pipeline, the paraffins will start precipitating out of the crude in the form of tiny crystals. As these paraffin crystals fall out of solution, they will adhere to the walls of the conduit, and the fluid passing through is exposed to an ever increasing number of nucleation sites. Contemporaneously, the rate of paraffin precipitation generally accelerates because of the abundance of these nucleation sites. Eventually, the effective flow area of the conduit is significantly reduced and, hence, cleaning of the pipeline to eliminate the paraffin deposits is desired.

Prior art methods of removing paraffin deposits from pipelines have been expensive and time-consuming. One method has employed a mechanical action by using "pigs" which effect a wiping action with the bore of the pipeline. Such pigs have been pumped through the partially clogged section of the pipe to mechanically remove the paraffins from the walls and then force the paraffins out to an accesible portion of the pipeline where the paraffins can be removed from the pipeline and properly disposed. However, this method is somewhat limited and is particularly effective only for the removal of a relatively small thickness of deposits of paraffins. As the paraffin deposits increase in thickness, the pressure required to force the pigs through the pipeline goes up substantially, sometimes approaching the pressure limits of the pipeline, and certainly the operator cannot afford to bulge the pipeline and thus destroy the external and/or internal coating of the pipeline.

A second prior art approach to removing deposited paraffins from the bore of pipelines and similar conduits used to transmit hydrocarbons is to employ a heated solvent capable of dissolving the paraffin deposit and to flow the heated solvent over the paraffin. This method is characterized by extremely high costs, both for the solvent solution and for the energy costs involved in maintaining the solvent at a sufficiently high temperature to effect the efficient dissolving of the paraffin deposit.

In U.S. Pat. No. 4,178,993 to RICHARDSON, et al, there is disclosed a method of initiating production from a gas well by injecting into a subterranean well an aqueous liquid that contains reactants which form nitrogen gas within the well or reservoir, and displaces enough liquid out of the well to lower the hydrostatic pressure and cause fluid to flow from the reservoir to the well. The same reactants produce exothermic heat.

A later patent to RICHARDSON, et al, U.S. Pat. No. 4,399,868, employs the same reactive ingredients as were utilized in the earlier patent to generate nitrogen gas, to not only generate nitrogen gas but, by the exothermic reaction, produce heating of a solvent solution which is introduced into the production zone of a well to effect the dissolution of paraffin and similar deposits from the perforations of the production zone.

These operations are, however, complicated by the presence of a large amount of brine solution which is normally found in a producing zone of a well. Additionally, the solvent solution is heated to temperatures on the order of 440° F. Temperatures of this order of magnitude can be tolerated in the production zone of a well, but would generate excessive stresses if employed in a hydrocarbon transmission conduit, such as a pipeline. More importantly, in such patented processes, the well's ambient temperature was stated to be on the order of 175° F., thus preventing any dissolved paraffins from precipitating out of solution in crystalline form.

U.S. Pat. No. 4,219,083 to RICHARDSON, et al, describes a process for cleaning well casing perforations by injecting an aqueous solution containing nitrogen-gas-generating reactants, an alkaline buffer providing a reaction-retarding pH, and an acid-yielding reactant for subsequently overriding the buffer and lowering the pH in order to trigger a fast-driving pulse of heat and pressure which causes a perforation-cleaning backsurge of fluid through the perforations. Again, this method, as disclosed, might produce undesirable stresses if applied to the cleaning of a pipeline and would not prevent the reprecipitation of the paraffins as the temperature falls, particularly in a subsea pipeline.

There is an obvious need, therefore, for a cleaning method and composition which will minimize the cost of any solvents employed and substantially reduce the cost associated with heating the solvent.

SUMMARY OF THE INVENTION

The present invention relates to a process and composition for removing paraffin deposits from a hydrocarbon transmission conduit, and particularly a subsea pipeline, by bringing chemically activated heat and a hydrocarbon solvent into contact with the paraffin deposits. The heat is provided by an aqueous liquid solution of nitrogen-generating reactants selected for generating heat and nitrogen gas at a significant but moderate rate. The aqueous solution is thoroughly emulsified and mixed with a hydrocarbon solution containing a solvent selected for its ability to dissolve the particular paraffins in the deposit. In a preferred form where comparatively low temperatures are encountered, such as with a subsea pipeline, the hydrocarbon solution further contains a crystalline modifier selected to produce a minimal pour point for the paraffins involved in the deposit, and thus prevent the reprecipitation of the paraffins once they have been dissolved in the heated solvent and then subjected to the inherent cooling action involved in the conduit. Either the aqueous solution or the hydrocarbon solution preferably also contains an emulsifier to maintain an emulsion of the hydrocarbon solvent in the aqueous solution.

Lastly, a buffered pH modifier, such as a buffered solution of HCl, or sodium hydroxide, is added to the aqueous solution to provide a pH sufficiently low so as to retard the heat and nitrogen-generating reaction so that no significant portion of the reaction occurs until the conduit containing the deposits is filled with the emulsified mixture of the aqueous and solvent solutions.

As the chemical reaction proceeds, the emulsified solution in the vicinity of the paraffin deposits is heated to a temperature in the range of 150° to 200° F. so as to effect a kinetically energized fluid to provide the melting of the paraffin deposits. The nitrogen fluid or gas concurrently generated with the release of the exothermic heat provides an agitation of the heated emulsified solution to bring the solvent portion of the solution into intimate contact with the paraffin and thus assure the dissolving of the paraffin in the solvent component of the emulsified solution.

When the heat and nitrogen-producing reaction is completed, the temperature of the solution contained in the pipeline falls rapidly to the ambient temperature which, in the case of a subsea pipeline, is on the order of 40° F. Notwithstanding this drop in temperature, the additional incorporation of a crystalline modifier in the solvent solution effectively prevents the reprecipitation of the dissolved paraffins and permits the removal of the reacted solution and solvent emulsion containing the dissolved paraffins from the pipeline for appropriate disposition.

Further advantages of the invention will be readily apparent to those skilled in the art from the following detailed description, taken in conjunction with the annexed sheet of drawing, on which is schematically illustrated the process of this invention.

DESCRIPTION OF THE PREFERRED EMBODIMENTS

Figure 1:
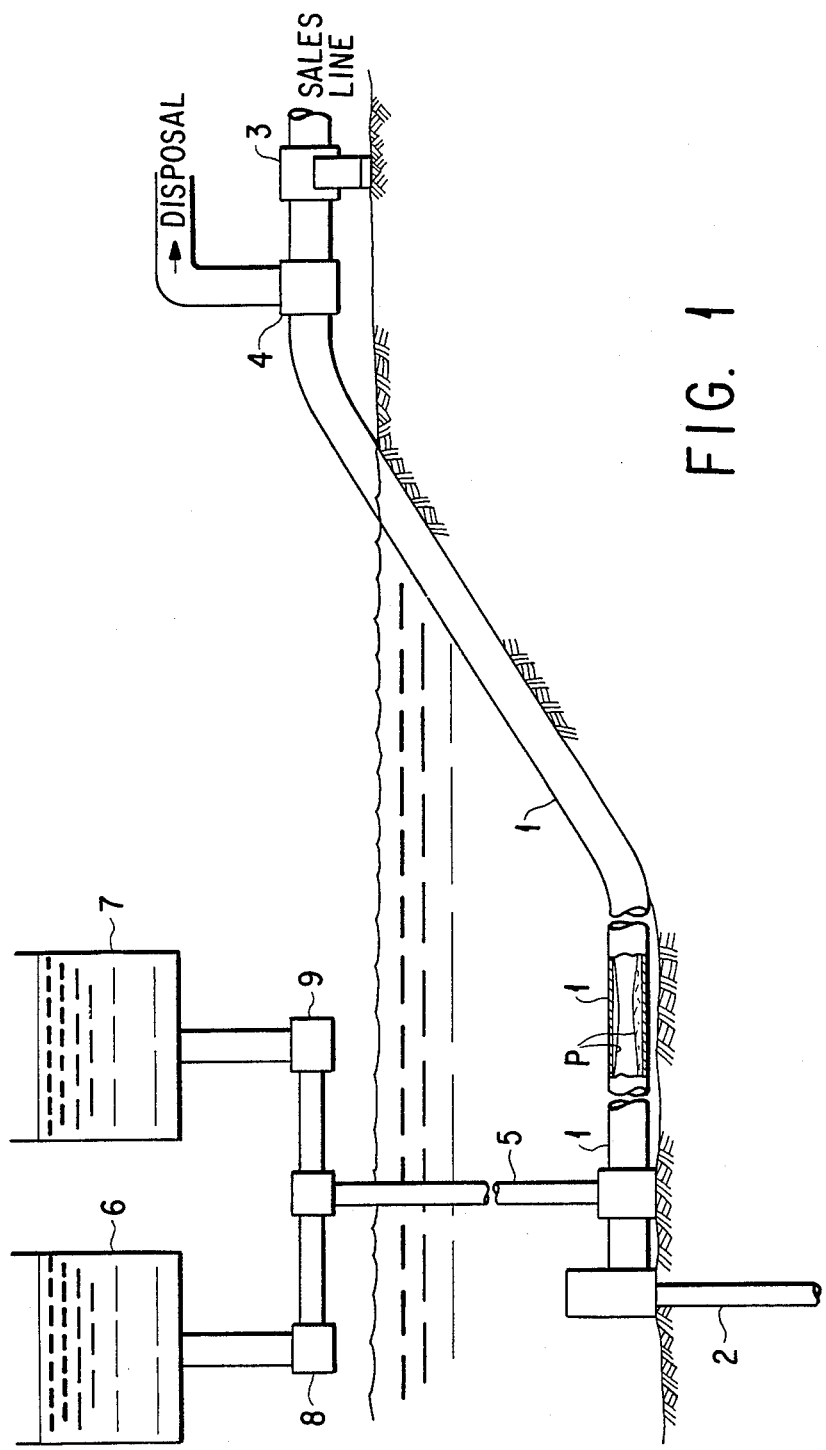
FIG. 1 is a schematic block diagram illustrating schematically the apparatus used in the pipeline-cleaning process of this invention.

Referring to the drawing, a section 1 of a pipeline is shown within which an accumulation of paraffin precipitates P has occurred to the extent that the flow area of the pipeline 1 is significantly impaired. To remove the paraffin precipitates, the portion 1 of the pipeline containing the precipitates is isolated from the rest of the system at points on both sides of the location of the precipitate deposit, but preferably as close as possible, through utilization of access connections to the pipeline originally installed with the line. Thus, for example, if the pipeline extends from a producing subsea well 2 to a collecting station 3 located on shore, there could very well be several miles of pipeline containing the paraffin precipitates. There is provided a treatment conduit always an access connection 5 intermediate the pipeline 1 and the well 2 at the wellhead or other location and, similarly, there is an access connection 4 located at the collecting station 3. Appropriate valves (not shown) in the access 4 or conduit 5 may be closed and the cleaning solution embodying this invention introduced through the other valve. Of course, the flow of crude oil from the well 2 is interrupted during the paraffin-removing or cleaning process.

An emulsified mixture of an aqueous solution of nitrogen gas-generating exothermic reactants, and a hydrocarbon solution of a paraffin-dissolving amount of a solvent containing an emulsifying agent, is introduced into the one end of the pipeline section 1 and the entire pipeline section 1 is filled with the intermixed solution. If desirable, a crystalline modifier may be included within the hydrocarbon solution. By use of the term "crystalline modifier", we intend to refer to any chemical, such as a copolymer of ethylene and vinyl acetate or an esterified olefin/maleic anhydride copolymer, which will modify the crystal growth of a paraffinic crude. The modification of the crystal growth is thought to occur because either; (1) the active chemical comes out of a solution at a temperature slightly higher than the cloud point temperature of the crude oil causing nucleation, or (2) the active chemical comes out of the solution and co-crystallizes with the paraffinic crystals. In either case by incorporation of the crystalline modifier, the normal crystal habit of the paraffin wax is sufficiently deformed to stop or inhibit further growth of the crystal.

Preferably, as illustrated in FIG. 1, separate components of the intermixed solution are provided from two tanks 6 and 7 by pumps 8 and 9. The one tank contains an emulsion of hydrocarbon solvent, crystalline modifier (when required), and an emulsifying agent with an aqueous solution of one of the reactants producing the nitrogen and the reaction-generated heat. The other tank contains an emulsion of the hydrocarbon paraffin solvent, the crystalline modifier (when required) and emulsifying agent, and an aqueous solution of the other reaction component. Thus, the tank 6 may contain an aqueous solution of sodium nitrite while the other tank 7 contains an aqueous solution of ammonium nitrate. The ammonium nitrate aqueous solution also contains an aqueous solution of a buffering agent which includes hydrogen chloride, or the like, in a quantity selected to produce a pH of the resulting emulsion at a value selected to slow the reaction rate to a desired level, as will be discussed in more detail hereinafter.

In the present invention, nitrogen-forming reactants for use in the invention can include water-soluble amino nitrogen-containing compounds having at least one nitrogen atom to which at least one hydrogen atom is attached and which are capable of reacting with an oxidizing agent to yield nitrogen gas within an aqueous medium. These compounds typically include amonium salts of certain organic or inorganic acids, amines, nitrogen-linked hydrocarbon-radical substituted homologs of such compounds, so long as they react with an oxidizing agent to produce nitrogen gas and other materials which are liquid and fluid and dissolve in water to form fluids which are substantially inert relative to the transmission conduits. Typical of such nitrogen-containing compounds are: amonium chloride, amonium nitrate, amonium nitrite, anomium acetate, anomium formate, ethylene diamene, formamide, acetamide, urea, benzyl urea, butyl urea, hydrazine, phenylhydrazine, phenylhydrazine hydrochloride, and the like. Particularly suitable are the amonium salts, including amonium chloride and amonium formate. Such nitrogencontaining reactants are well known to the art, and are as disclosed, for example, in U.S. Pat. No. 4,399,868.

Buffering compounds are systems suitable for incorporation in the present invention comprise substantially an water-soluble buffer which is compatible with the nitrogen-generating reactants and their products and which tends to maintain the pH of an aqueous solution at a value of at least about 7. Examples of suitable buffering materials include the alkali metal and amonium salts of acids such as carbonic, formic, acetic, citric, and the like, acids. When relatively high pH systems are required, salts of amines or amino-substituted compounds such as EDTA, and the like, can utilized. Again, such buffering compounds are well known to those skilled in the art, and may be as disclosed in U.S. Pat. No. 4,399,868.

The portion of the transmission conduit containing the paraffin and which is required to be treated to remove such paraffin therefrom, may be "isolated" by closing off the interior of the conduit at a pre-determined point upstream of the paraffin deposit and upstream of the injection point for introduction of the emulsified mixture of the aqueous and hydrocarbon solutions. Such isolation may also include closing off a valve, or the like, downstream of the paraffin deposit at the location in the conduit which is required to be treated. However, downstream isolation may not be required in some instances, particularly where a continuous treatment is provided over an extended period of time, with the treatment including at least a nominal fluid flow for ejection of the treatment solution with the removed paraffin deposit. Isolation may also be effected by providing a balancing of the pressure between the section of the conduit to be treated and a point in the conduit upstream of the treatment area.

There are a number of ways of introducing the emulsified treating solution into the area of the conduit to be treated, such as by spotting, batch, continuous, cylical, or other treatment means well known to those skilled in the art of treating pipelines and other hydrocarbon conduits above the top of a subterranean well for the removal of paraffin deposits.

More specifically, the solution A contained in tank 6 may comprise, for each 50 barrels, about 43 barrels of fresh water and aboiut 9,660 pounds of sodium nitrite, yielding a mole ratio of 8. Solution B contained in tank 7 constitutes, for a 50-barrel tank capacity, about 33 barrels of water, about 11,200 pounds of ammonium nitrate, yielding a mole ratio of 8, and about 11.7 gallons of 37 percent hydrochloric acid. On laboratory-equivalent preparations, these quantities of reactants will produce maximum temperatures on the order of about 160° F. However, in actual practice, the temperature may exceed about 400° F., depending on the ambient temperature surrounding the pipeline and other variables. Additionally, the solutions A and B are augmented by the addition of a hydrocarbon solvent ranging in volume from about 25 to about 50 percent of the total tank volume of the aqueous solution. Since the hydrocarbon solvent typically will be the most expensive element employed in the process, it is obviously desirable to use as little solvent as required to effect the dissolution of all of the paraffin precipitates. As previously mentioned, such hydrocarbon solvent may also include a pour point depressing amount of crystalline modifier and an emulsifying agent in order to produce a good emulsion of the hydrocarbon solution with the aqueous solution.

The amount of, for example, buffered acid added to the tank as a pH modifier is largely dependent upon the distance of the major deposit of paraffin precipitate in the pipeline from the access connection through which the cleaning solution is introduced. Normally, the cleaning solution is introduced through the access connection 4 immediate the wellhead and removed after the cleaning is accomplished through the access connection 6 at the collecting station 3. A computerized calculation has been developed to indicate the pH value required to delay the substantial initiation of the chemical reaction between the sodium nitrite and the ammonium nitrate until the inserted solutions have had time to fill up the isolated pipeline section 1 and surround the precipitate layer P. While this calculation can be performed by anyone ordinarily skilled in this art, the details of the calculation are set forth below in the interest of completeness of disclosure. In such calculation and the working examples below, the phrase "N-SITU" has been employed to represent the aqueous solution of the reactants which react exothermically to produce nitrogen gas and a heat spike. N-SITU is a Trademark for products and services associated therewith of the Assignee.

In order to locate the heat spike in the pipeline generated by the injection of an N-SITU and paraffin solvent mixture, it is necessary to determine the physical properties of the mixture.

The physical properties; i.e., heat capacity, vapor-pressure, heat of vaporization, thermal conductivity, and viscosity, of the immiscible liquid mixtures may be determined as follows.

1. Heat capacity, Cp $$(Cp)m = (Cp)1 \times 1 + (Cp)2 \times 2 + \ldots$$

where
$(Cp)m$ = heat capacity of the mixture,
$(Cp)i$ = heat capacity of the component i (i=1, 2, ...)
xi = weight or molar fraction of component i (i=1, 2, ...)

2. Heat of vaporization, Lv $$(Lv)m = (Lv)1 \times 1 + (Lv)2 \times 2 + \ldots$$

where
$(Lv)m$ = heat of vaporization of the mixture
$(Lv)i$ = heat of vaporization of the component i (i=1, 2, ...)
xi = weight or molar fraction of component i (i=1, 2, ...)

3. Thermal conductivity, K $$Km = Kc(2Kc = Kd - 2\phi d(Kc - Kd))/(2Kc + Kd = \phi d - (Kcx - Kd))$$

where
Km = thermal conductivity of the mixture Kc,
Kd = thermal conductivity of the continuous and discontinuous phase, respectively
$\phi$ = phase volume fraction 4. Viscosity, $\mu$ for $\phi d < 0.03$:

$$\mu m = \mu c(1 + 2.5 \phi d((\mu d + 0.4 \mu c)/(\mu d + \mu c)))$$

for larger values of $\phi d$:

$$\mu m = (\mu d)^{\phi d}(\mu c)^{\phi c}$$

where subscript m, c, and d denote the mixture, continuous, and discontinuous phases, respectively, and where $\phi$ is phase volume fraction.

CALCULATION OF THE TEMPERATURE PROFILE IN THE FLOW STREAM

The mixture of N-SITU and paraffin solvent plus additives is immiscible; therefore, the heat and N2 gas generation from the reaction of N-SITU solution is not affected. The temperature profile in a flow pipe during a treatment of N-SITU and paraffin solvent mixture can be estimated by calculating the heat balance of a single small volume of the mixture in the pipe as it transits from one end to the other end of the pipe. The single small volume is referred as an "element". The heat balance of an element can be expressed as:

$$HG = HL + HH + HV$$

where
HG = heat generated by the reaction of N-SITU solution in calories
HL = heat transferred across pipes to/from the surrounding in calories
HH = heat used to raise the temperature of the mixture in calories
HV = heat lost/gained due to vaporization in calories.

Suppose a mixture of N-SITU and paraffin solvent, plus additives was pumped into a flow pipe at a constant rate Q(BPM). The mixture contains X1 barrels of N-SITU solution and X2 barrels of paraffin solvent, plus additives. The temperature rise in the element is calculated as described below. At each position of the element (starting at the inlet and ending at the outlet of the pipe), the following factors are considered:

1. Heat generated by the N-SITU solution in the time during which the element is located at the position;
2. Heat transferred across pipe to/from surrounding;
3. Heat lost/gained due to vaporization of the mixture; and
4. The nitrogen gas generated by the N-SITU solution in transit down the pipe is allowed to change the volume of the element according to the existing pressure and temperature of the element.

When the temperature rise is calculated, the element is moved to the next position of the pipe (as indicated by the transit time, t, selected for the element) and the calculation repeated until the element is at the outlet of the pipe. This will give the temperature profile in the pipe for that element. While the volume of the element changes in transit down the pipe, the volume of the liquid in each element is considered fixed and is determined by:

$$V = 159\ Q\ t$$

where
V = volume of the liquid in each element, liters
Q = pump rate, barrels per minute
t = retention time for the element in each position, minutes
159 = conversion factio from barrel to liter The volume of N-SITU solution, V1, and the volume of the solvent, plus additives, V2, can be calculated as follows:

$$V1 = V\ (X1/(X1 = X2))$$
$$V2 = V\ (X2/X1 = X2))$$

The volume of the gas in each element is depended on the pressure and temperature of the element. The pressure, P, in the element depend on the position of the element in the pipe and on the inlet pressure. Thus:

$$P = Pi = X(Po - Pi)/L = 14.696$$

Where
P = pressure in the element, Psia
Pi = pressure at the inlet of the pipe, Psi
Po = pressure at the outlet of the pipe, Psi
X = position of the element, feet
L = length of the pipe, feet The maximum temperature of the element is limited by the boiling point of the mixture. This can be determined by the antoine equation below:

$$\log (Pv) = A - B/(T + C)$$

Where
Pv is vapor pressure in mm of Hg
T is the temperature at degree C
A, B, and C are constants for a particular substance For water, A = 7.96681; B = 1,668.21; C = 228 For other substances, accuracy is best when all three constants are evaluated from data The boiling temperature of the mixture at pressure P of the element is given by:

$$Tb = 273 - C - B/(\log (P(760/14.696)) - A)\ \text{Deg. Kelvin}$$

DETERMINATION OF HEAT GENERATED, HG

The amount of heat generated is determined by the mole of nitrogen generated as follows:

$$HG = Cr \times V1 \times N2$$

Where
HG, V1 are already defined above
Cr = 70,000 = heat of reaction, calories/mole of nitrogen
N2 = moles of N2 generated in the element per liter of N-SITU solution during transit time t and is determined by the following equation assuming the evolution of nitrogen is a second order reaction $$N2 = a - a/(1 + akt)$$

Where
t = retention time in the element, minutes
a = starting concentration of N-SITU solution in the element, M/L
k = rate constant of second order reaction and can be determined as a function of temperature by the following Arrhenius equation:

$$k = S\ \exp(-Ea/RT)$$

Where S is a frequency factor, Ea is the energy of activation, R is the gas constant and T is absolute temperature in Kelvin. Replacing Ea/R by Ha, and T by current element temperature T+DT, the above equation becomes:

$$k = S\ \exp(-Ha/(T + DT))$$

DETERMINATION OF HEAT USED TO RAISE THE TEMPERATURE OF THE MIXTURE

The amount of heat used to raise the temperature of the mixture is determined by the following equation:

$$HH = 1{,}000 \times Cp \times \rho \times V \times DT$$

Where Cp is the heat capacity of the mixture in cal/g, $\rho$ is the density of the mixture in g/cc at current temperature of the element, V is the volume of liquid in the element, and DT is the temperature rise in the element in degree Kelvin.

Let $C1 = 1{,}000 \times Cp \times$ and substituting in the above equation yields:

$$HH = C1 \times V \times DT$$

DETERMINATION OF HEAT LOST/GAINED DUE TO VAPORIZATION, HV

The amount of heat lost/gained due to vaporization is depended on the amount of vapor formed in the element during transit time t and can be expressed as follows:

$$HV = Lv \times V \times Va$$

Where HV, and V are already defined above, Lv is the latent heat of vaporization of the mixture in cal./g.-mole, Va is moles of vapor in the element per liter of mixture during transit time t. The amount of vapor is calculated as described below.

The volume ratio of vapor to nitrogen gas, VNR is given by:

$$VNR = Pva/PN2$$

or;

$$VNR = Pva/(P - Pva)$$

Where PN2 is the partial pressure of nitrogen in the element, and Pva is the vapor pressure of the mixture.

The vapor pressure of the mixture at current element temperature, PVA is determined by the Antoine equation:

$$Pva = 10 \times \times (A - B/(T + DT - 273 + C)) \times 14.696/760,\ \text{Psia}$$

Where
T = initial temperature of the element when moved to its current position, degree Kelvin
DT = temperature rise in the element, degree Kelvin The amount of vapor, Va is given by:

$$Va = (VNR \times XN2 - VNR1 \times XN1) \times (V1/V),\ \text{mole/leter of solution}$$

Where VNR, VNR1 are current and previous vapor nitrogen ratio, respectively, and XN2 is cumulative moles of nitrogen generated in the element per leter of N-SITU solution and is given by:

$$XN2 = XN1 + N2$$

Where XN1 is cumulative moles of nitrogen generated previously in this element per leter of N-SITU solution, and N2 is already described above.

The cumulative volume of nitrogen gas in the element per liter of the N-SITU solution is calculated using ideal gas equation:

$$VN2 = XN2 \times 1.206(T + DT)/P,\ \text{liter N2/liter N-SITU solution}$$

The volume of mixture vapor in gas per liter of solution, Vva is:

$$Vva = VNR \times XN2 \times 1.206 \times (T + DT)/P,\ \text{liter vapor/liter solution}$$

The total gas volume per liter of solution, Vg is:

$$Vg = (VN2 + Vva) \times (V1/V)$$

The total volume of the element, Ve is:

$$Ve = V + V \times Vg,\ \text{liters}$$

The length of the element, Le is then given by:

$$Le = Ve/(Pc \times 159.0),\ \text{feet}$$

Where Pc is the pipe capacity in barrels per feet.

DETERMINATION OF HEAT TRANSFERRED ACROSS PIPES TO/FROM THE SURROUNDING

The heat transferred across pipes to/from the surrounding is calculated as follows:

$$HL = B1 \times A\square \times t \times (T + DT - TA),\ \text{calories}$$

where $A\square$ = area based on $\square$.D. of the pipe, $cm2 = 3.1416 \times P\square D \times Le \times 77.42$ t = transit time in minutes
ta = surrounding temperature in degree Kelvin
B1 = overall heat transfer coefficient in cal/cm2- C-min.
B1 is depended on the type of flow, pipe dimension, and fluid and surrounding material properties.

Substituting all of the heat terms in the energy balance equation, the following expression is obtained:

$$Cr \times V1 \times N2 = C1 \times V \times DT + Lv \times V \times Va + B1 \times A\square \times t \times (T + Ta)$$

All three terms on the right contain the variable DT (the temperature rise in the element). This term can be determined by rearranging the above equation as follows:

$$F(DT) = Cr \times V1 \times N2 - C1 \times V \times DT - Lv \times V \times Va - B1 \times A\square \times t \times (T + Dt - Ta) = 0$$

then applying Bisection method to solve for variable DT.

This program is effected and is based on "activation energy units", or opposed to units of pH. Of course, there are other ways known to those in the art for determining the proper buffered pH required to abate the reaction time.

From these calculations, the pH value of the aqueous reactant solution to produce the heat spike at the location of the paraffin precipitate P can be determined.

It should be noted that the buffered control of the pH value of the intermixed reacting solutions does not effect the total amount of heat generated nor the total amount of nitrogen gas liberated. This is determined solely by the relative proportions of the reacting components contained within the emulsified aqueous solutions. The pH value is selected at a sufficiently high level to delay the speed of the reaction so that no significant part of the reaction occurs until the fluid has filled up the isolated section of pipeline and is in contact with the precipitated layer P of paraffin.

The hydrocarbon solvent employed is preferably selected by a bench test in a manner that will be readily apparent to those skilled in the art. There is a wide variation in the type of paraffins produced by various crude oils, but the specific type or types precipitated as a deposit in a pipeline can be determined by periodic sampling of the crude oil passing through the pipeline. Such paraffins are then employed in bench tests to select a solvent that is the most efficient in not only effecting the dissolution of the paraffins in a liquid state, but also in retaining the paraffins in solution after the temperature has dropped below the melting point of the particular paraffin. Thus, the invention has been successfully employed utilizing an aromatic solvent sold under the Trademark "ParaSolv 504" by J. RIGGS AND COMPANY of Amareta, Texas. A large variety of suitable hydrocarbon solvents are available in the marketplace and routine bench testing will always determine the solvent that can be most efficiently employed for the particular types of paraffin contained in the particular pipeline.

In similar fashion, the crystalline modifier employed may be determined by bench tests. The process of this invention has worked successfully with a crystalline modifier sold by MAGNA Corporation of Houston, Texas, under the name designation "MAGNA A Wax 950" and referred to herein as "A-950". Conventional bench tests will indicate which crytalline modifier and the required amount will be the most effective to depress the pour point of the paraffin and thus insure that the paraffin is retained in solution in the aromatic solvent.

The emulsifier employed again may constitute any commercially available material employed to maintain an emulsion of oil in water between aqueous base fluids and hydrocarbon base fluids that will not chemically react with other fluids.

It is believed essential to the successful practice of this invention that bench tests be employed to select the best aromatic solvent and (when required) the best crystalline modifier for the particular paraffins to be removed. This is clearly shown in the results from the following bench tests wherein a fixed quantity of paraffin was immersed in a variety of different aromatic solvents and different crystalline modifiers were employed. The paraffin was heated to approximately 175° F. to convert it to a liquid state and the resulting solution was stirred to attempt to dissolve the paraffin in the aromatic solvent. If solution of the paraffin was produced, the solution containing the dissolved paraffin was then lowered in temperature to approximately 45° F., representing a typical subsea pipeline temperature, and the solution was closely observed to determine whether the paraffin again precipitated out of solution. Out of the following listed nine examples, only the last three examples resulted in satisfactory dissolution and retention of the paraffin in solution in the aromatic solvent.

EXAMPLE I

| TABLE OF BENCH TEST RESULTS | |
|---|---|
| Chemical System | Observations |
| (1.) | |
| 20 ml N-SITU, | Paraffin solidified after spending |
| 10 ml Paraffin. | and cooling of N-SITU to 75° F. |
| (2.) | |
| 20 ml N-SITU, | Paraffin solidified after spending |
| 2 ml (10%) ParaSolv 504, | and cooling of N-SITU to 75° F. |
| 10 ml Paraffin. | |
| (3.) | |
| 20 ml N-SITU, | Paraffin solidified after spending |
| 2 ml ParaSolv 504, | and cooling of N-SITU to 75° F. |
| .1 ml (.5%) A-301 Crystalline Modifier, | |
| 10 ml Paraffin. | |
| (4.) | |
| 20 ml N-SITU, | Paraffin did not solidify, but was |
| 2 ml ParaSolv 504, | viscous after spending and cooling |
| .1 ml X-588 Crystalline Modifier, | of N-SITU. |
| 10 ml Paraffin. | |
| (5.) | |
| 20 ml N-SITU, | Paraffin solidified after spending |
| 2 ml ParaSolv 504, | and cooling of N-SITU to 75° F. |
| .1 ml A-901 Crystalline Modifier, | |
| 10 ml Paraffin. | |
| (6.) | |
| 20 ml N-SITU, | Paraffin did not solidify, but was |
| 2 ml ParaSolv 504, | viscous after spending and cooling |
| .1 ml A-950 Crystalline Modifier, | of N-SITU. |
| 10 ml Paraffin. | |
| (7.) | |
| 20 ml N-SITU, | Paraffin was softened and dispersed, but did not remain flowable |
| 2 ml ParaSolv 504, | after cooling. |
| .4 ml A-901 Crystalline Modifier, | |
| .4 ml A-921 Dispersant, | |
| 10 ml Paraffin. | |
| (8) | |
| 20 ml N-SITU, | Paraffin emulsified with N-SITU; |
| 10 ml (50%) ParaSolv 504, | it remained dispersed, emulsified, |
| .4 ml A-950 Crystalline Modifier, | and flowed after cooling to 45° F. |
| .4 ml A-921 Dispersant, | |
| 10 ml Paraffin. | |
| (9) | |
| 20 ml N-SITU, | Paraffin/N-SITU emulsion was not |
| 10 ml ParaSolv 504, | as flowable as above mixture with |
| .4 ml X-448 Crystalline Modifier, | A-950. |
| .4 ml A-921 Dispersant, | |
| 10 ml Paraffin (different than Test 8). | |
| (10) | |
| 20 ml N-SITU, | Paraffin partially melted and was |
| 10 ml ParaSolv 504, | dispersed in the ParaSolv 504; |
| .4 ml A-921 Dispersant, | quansive paraffin were visible but |
| 10 ml Paraffin. | the system was partially emulsified and flowable after spending and cooling at 75° F. |

In the above table, N-SITU constitutes the previously described aqueous solution of equal molar quantities of sodium nitrite and ammonium nitrate; ParaSolv 504 constitutes the aromatic solvent product of J. RIGGS AND COMPANY; A-301 is a crystalline modifier of NALCO sold as "NALCO ASP-348"; A-901 is a crystalline modifier sold by MAGNA Corporation as "D-Wax 901"; and X-588 is a crystalline modifier of NALCO sold under the name "NALCO X-588." A-921 constitutes a dispersant or emulsifier sold by NALCO CO.; and X-448 constitutes a crystalline modifier sold by NALCO Chemical Company of Sugarland, Tex., under the name "NALCO ASP-448".

The foregoing test results clearly indicate the desirability of selecting the crystalline modifier as a result of bench tests wherein varying quantities and types of the crystalline modifier are tested with a particular aromatic solvent to determine the solubility retention of the particular paraffins which are to be removed from the pipeline. The above bench tests comprised adding the specified quantities of the N-SITU to a selected quantity of an aromatic solvent and a selected quantity of a crystalline modifier. These elements were placed in a beaker with a fixed quantity of paraffin in solid form and, within a matter of minutes, the exothermic reaction of the N-SITU components elevates the temperature of the beaker contents to approximately 175° F. and converts the paraffin to a liquid state. The resulting nitrogen agitates the solvent into intimate engagement with the paraffin and, if the selected solvent is correct for the particular paraffins being tested, the paraffins will go into solution. When the reaction is completed, the beaker is placed in an ice bath and the contents thereof are cooled to 45° F., which proximates the ambient temperature of a subsea pipeline. During this cooling, if the crystalline modifier is required and is proper for the particular paraffins and the particular aromatic solvent, the paraffin will remain in solution and not precipitate out as solid crystals.

With the foregoing description, those skilled in the art will be readily able to make the proper selection of aromatic solvents and crystalline modifiers to provide optimum dissolving of the liquid paraffin as a result of the heat generated by the exothermic reaction of the N-SITU reactants and to retain the paraffin in solution even though the temperature is subsequently dropped to about 45° F. The selection of an emulsifier is not particularly critical, but is desirable to achieve an emulsion of the N-SITU components and the solvent so as to expose the solvent to both the heat and the agitating effect of the nitrogen generated by the exothermic reaction of the N-SITU reactants.

Upon completion of the selection of the best aromatic solvent, the best crystalline modifier and the computation of the pH value required to insure that the reaction will be delayed until the isolated pipeline section is substantially filled with the emulsified liquid containing the reacting chemicals, the resulting solutions are made up in tanks 6 and 7 and are simultaneously introduced into the one end of the pipeline 1 and forcibly mixed by kinetic energy imparted to the respective fluids by pumps 8 and 9.

Most of the reaction of the reacting chemicals contained in the mixed solution occurs after the isolated section of pipeline 1 is at least partially filled with the emulsified solution of solvent and reacting chemicals. The total amount of heat generated by the reaction is, of course, a function of the amount of reacting chemicals contained in the aqueous solution. Typically a range of about 3 to about 10 moles for each of the sodium nitrite and ammonium nitrate components would be employed. A preferred mole concentration for such components is about 8. The maximum heat generated by the exothermic reaction is preferably on the order of about 175° F. Temperatures in excess of this figure would represent a threat to the integrity of the pipeline covering, due to expansion of the metal constituting the pipeline. Temperatures less than this value diminish the solubility of the liquified paraffin in the aromatic solvent.

The mixed solutions are permitted to remain in the isolated section of pipeline 1 until sufficient time has elapsed to insure that the chemical reaction has been completed. The solution is then pumped out of the isolated section of the pipeline, carrying with it the paraffin precipitates dissolved in the aromatic solvent.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A method of removing paraffin deposits from the interior of a generally horizontal isolated length of a hydrocarbon transmission conduit, comprising the steps of:

(1) introducing into the isolated length of the conduit containing the paraffin deposits, a pre-determinable amount of an oil-in-water emulsified mixture of an aqueous solution and a hydrocarbon solution, the aqueous solution comprising:

(a) in-situ nitrogen-generating components reactable to produce exothermic heat and nitrogen gas;

(b) a pre-computed amount of a buffered pH adjuster to produce a buffered pH value for the aqueous solution to abate the reaction rate of the in-situ nitrogen-generating components to a level permitting flow of said components into and along the isolated length to cover the paraffin deposits prior to completion of any significant portion of the exothermic reaction, thereby effecting temperature melting of the paraffin deposits in the generally horizontal isolated length by the exothermic heat of the nitrogen-generating reactions;

(c) the hydrocarbon solution comprising:

(a) a paraffin-dissolving amount of an aromatic solvent selected to dissolve the particular paraffins in the isolated length resulting from temperature melting of the paraffin deposit by the exothermic in-situ production of nitrogen; and (b) a pour-point depressing amount of a crystalline modifier selected to produce a minimum pour-point for the paraffins constituting the deposit to be removed to retain the dissolved paraffins in solution at the ambient temperature of the isolated conduit section, whereby the free nitrogen produced by the reaction of the nitrogen-generating components effects an agitation of the solutions to assist the dissolution of the melted paraffin in the aromatic solvent; and (2) then removing the solutions containing the dissolved paraffins from the isolated conduit section.

2. The method of claim 1 wherein the nitrogen-generating components comprise sodium nitrite in a concentration ranging from between about 3 to about 10 molar; and ammonium nitrate in a mole concentration approximately equal to that selected for the sodium nitrite.

3. The method of claim 2 wherein the molar concentration of both said sodium nitrite and said ammonium nitrate in said aqueous solution is about 8.

4. The method of claim 1 wherein the crystalline modifier is a polymeric compound comprising a polyethylene vinyl acetate and is provided in an amount of at least about 1% of the total volume of the aqueous and hydrocarbon solutions.

* * * * *